United States Patent [19]

McNaney

[11] 4,390,875
[45] Jun. 28, 1983

[54] MESSAGE CHARACTER IMAGE PROJECTION CONTROL SYSTEM

[76] Inventor: Joseph T. McNaney, 8548 Boulder Dr., La Mesa, Calif. 92041

[21] Appl. No.: 359,135

[22] Filed: Mar. 17, 1982

Related U.S. Application Data

[63] Continuation-in-part of Ser. No. 201,179, Oct. 27, 1980, abandoned.

[51] Int. Cl.³ ............................................... G08B 5/36
[52] U.S. Cl. ............................. 340/815.27; 340/783; 350/358
[58] Field of Search ............... 340/815.06, 815.27, 340/763, 783, 795, 796; 346/107 R, 108; 350/358; 354/12, 17

[56] References Cited

U.S. PATENT DOCUMENTS

| | | | |
|---|---|---|---|
| 3,611,891 | 10/1971 | McNaney | 340/783 X |
| 3,636,837 | 1/1972 | McNaney | 340/783 X |
| 3,653,067 | 3/1972 | Anderson et al. | 346/108 |
| 4,164,717 | 8/1979 | Blazey | 350/358 X |
| 4,179,689 | 12/1979 | McNaney | 340/815.06 |
| 4,251,806 | 2/1981 | McNaney | 340/815.27 |
| 4,280,755 | 7/1981 | McNaney | 350/358 |

Primary Examiner—John W. Caldwell, Sr.
Assistant Examiner—Daniel Myer

[57] ABSTRACT

Message character image projection control system utilizing a matrix array of individually shaped light forming window means, a source of light for illuminating the array of windows and acousto-optic light reflector means for controlling an optical path relationship between individual window means in the matrix and a common optical axis of the system.

2 Claims, 2 Drawing Figures

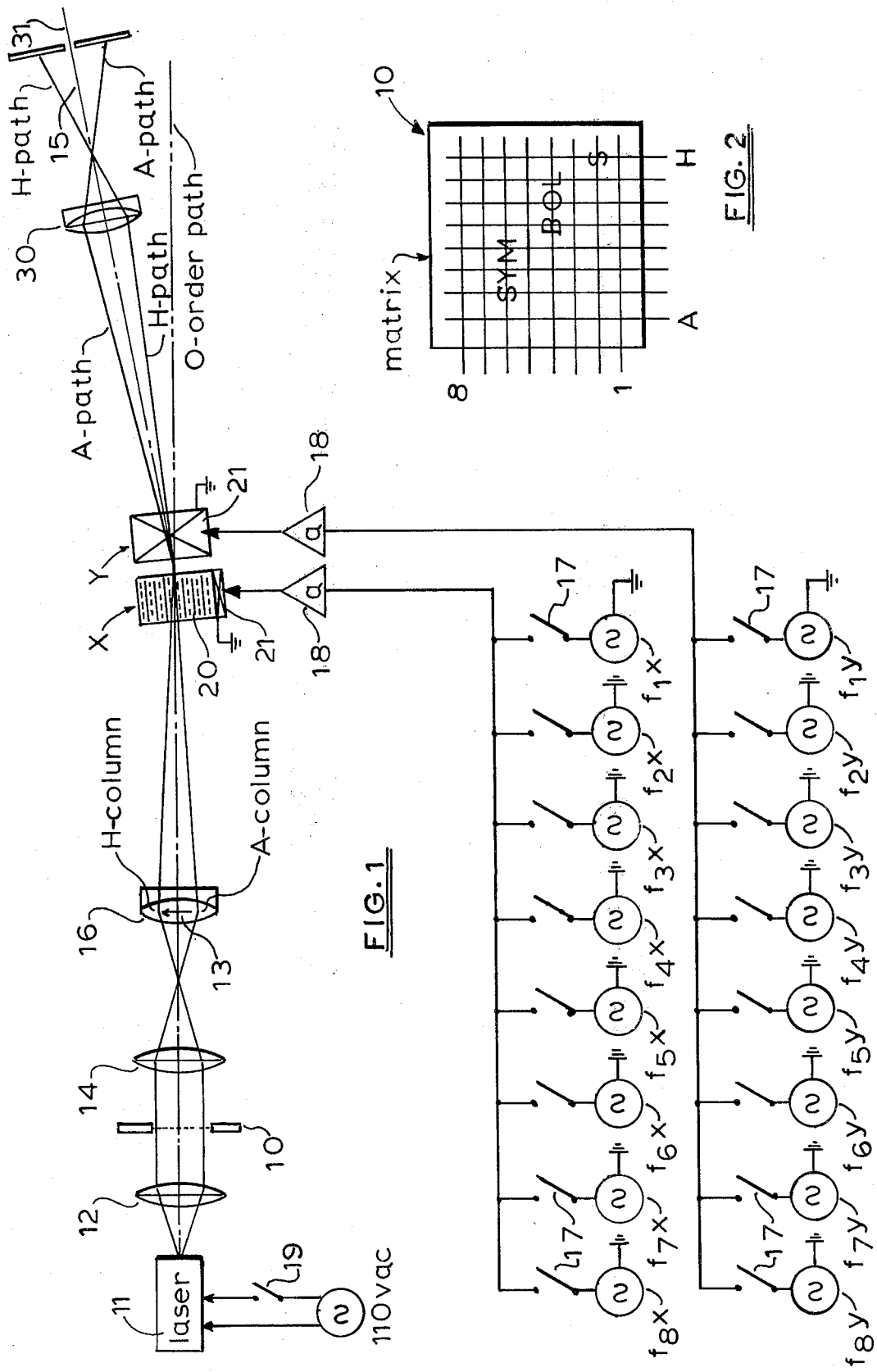

MESSAGE CHARACTER IMAGE PROJECTION CONTROL SYSTEM

RELATED U.S. APPLICATION DATA

Continuation in part of Ser. No. 201,179, filed Oct. 27, 1980, abandoned.

BACKGROUND OF THE INVENTION

This invention relates to an application Ser. No. 955,111 filed Oct. 26, 1978, now U.S. Pat. No. 4,179,689, and to an application Ser. No. 06/144,674 filed Jan. 23, 1980, now U.S. Pat. No. 4,251,806, wherein, in each case, the illuminated subject matter, or matrix, is representative of graphic symbol light beam forming window means, and wherein each window means is illuminated individually and from which images of symbols are derived selectively for a recording thereof.

SUMMARY OF THE INVENTION

The message character image projection control system of this invention includes an array of character shaped light forming window means, a source of light and means for exposing the entire array of window means simultaneously, as opposed to selectively, to said source of light, and optical means positioned along an optical axis of the system for establishing, selectively, optical path relationships between window means of the array and said optical axis. The window means are positioned in the matrix so as to provide a plurality of rows and a plurality of columns thereof. Said optical means along the axis include first and second acousto-optic cells, respectively, of first and second light reflection control systems, for effecting said optical path relationships between predetermined window means of said rows thereof and between predetermined window means of said columns thereof and the optical axis. Optical means along the axis include image projection and image focusing optics which provide for a viewing of light images of the character forming window means from along the common optical axis of the system.

An objective of the present invention is to permit a reducing to a minimum the area requirements and center-to-center spacing of the light forming window means in the matrix and reduce, accordingly, to relatively small and practical minimums the angular scan requirements of the acousto-optic light reflectors and the optical path length between these reflectors and the matrix of light forming window means. And, therefore, a further object is to improve upon the overall operating efficiency of these systems, including the use of means for flooding the matrix with light as opposed to utilizing a light source for each window means, or the use of additional light reflectors in combination with the use of a single light source. Embodiments of the invention illustrated or described herein exemplify the means for meeting these objectives and when read in connection with the drawing hereof the description which follows will provide a better understanding of these and still other objects and advantages of the present invention.

BRIEF DESCRIPTION OF THE DRAWING

FIG. 1 exemplifies schematically optical relationships of key elements of at least one embodiment of the invention;

FIG. 2 will be referred to when describing the locations of the window means representative of message characters in a matrix.

DESCRIPTION OF THE INVENTION

Referring now to FIG. 1, the invention is designated around the use of a matrix 10, which will also be identified as a font plate, containing an X-Y array of message character forming window means and from which graphic arts quality light images will stem upon an exposure thereof to light from a source of light 11. As but one example, the matrix 10, as exemplified in FIG. 2, will be described as containing an 8 by 8 formation of window means so as to provide eight rows 1 to 8 eight columns A to H thereof. Still other formations and numbers of window means utilized are of course possible. When energized, light source 11 provides a flooding of the array of window means in the matrix and with the use of a beam expander lens 12 if necessary; all of which will be illuminated simultaneously. And all references to the word "light" herein will be understood as including radiant energy extending from infrared, through the visible spectrum, to ultraviolet. The light source 11 is preferably that of a laser, a laser diode, or the like, but the invention is not to be limited in this regard.

Light projection optics 14 are included in the invention so as to provide an object image 13 of the array of window means of the font plate coincident with second light projection optics 16; the object image 13 being smaller in area than that of the array of window means in the font plate. First and second acousto-optic optical path relationship control means, including an X a-o cell and a Y a-o cell positioned along a common optical axis 15 of the system, are utilized in an operation of establishing, selectively, the images of illuminated character forming window means along the axis 15.

Each of the X and Y acousto-optic cells can be described as having an interaction medium 20 and a transducer 21 to which ultrasonic frequency voltages will be extended as hereinafter described. When responding to a voltage of an individual ultrasonic frequency the interaction medium of a cell is traversed by compression waves effecting periodic stratification of the medium, wherein the density is proportional to the applied acoustic power. The distance between two successive planes of maximum density is equal to the wavelength of the applied voltage. Each device is designed and positioned along the optical axis 15 whereby the orientation of a given strata, for maximum efficiency of operation, agrees with the Bragg angle relative to the 0-order path for light rays through the medium. Under these conditions the periodic stratification of the medium allows it to take the form of, and behave like, a stacked array of planar light guides, each presenting a graded index profile and a path for a viewing of light therethrough including a bending thereof corresponding to the frequency of the applied voltage.

Ultrasonic frequency voltages will be connected to the X a-o cell, selectively, from generators $f_1x$ to $f_8x$, to the Y cell, selectively, from generators $f_1y$ to $f_8y$. Individual frequency voltages from the eight generators for the X a-o cell, and from the eight generators of the Y a-o cell, will extend, for example, over a range of frequencies from 31 MHz to 45 MHz. The connecting of the output of each generator to each of the a-o cells will be through individually controlled interconnecting circuitry means, exemplified simply as ON/OFF switches 17, and thereupon through an amplifier 18 of each cell. Voltage from a 110 vac source, for example, to the laser light source 11 will be effected through what is exemplified as a simple switch means 19, when in a closed, or ON, position.

The connecting of a 31 MHz voltage from the $f_1x$ generator to the X cell provides for a relating of the A-column window means to the common optical axis 15. The connecting of a 31 MHz voltage from the $f_1y$ generator to the Y cell provides for a relating of the 1-row window means to the common optical axis 15. Under these conditions an optical path relationship will have been established between a window means of the font plate 10, or matrix, coinciding with the intersecting of the A-column and the 1-row window means position of the matrix and the common optical axis 15. With the switch 19 in a closed, or ON position, an optical image of the window means will be available from along the common optical axis 15 and through the optical center of projection optics 30.

As a further example, the connecting of a 45 MHz voltage from the $f_8x$ generator to the X cell, and the connecting of the 45 MHz voltage from the $f_8y$ generator to the Y cell, an optical path relationship will have been established between a window means coinciding with the 8-H position in the font plate 10 and the common O-A 15. With the switch 19 in an ON position an optical image of the window means will be viewed from along the common O-A through the center of the projection optics 30. From the foregoing explanations it should be understood that the connecting of the X and Y a-o cells, respectively, to any one of 64 individual pairs of ultrasonic frequency voltages available from the array of generators, $f_1x$ to $f_8x$ and $f_1y$ to $f_8y$, it will be possible to establish an optical path relationship between a corresponding one of the 64 window means in the font plate. And with light from the source 11 flooding the entire array of the window means in the font plate 10 any one of the window means can be viewed, selectively, from along the common optical axis 15.

The established optical path relationships between window means of the font plate 10 are representative of 1st-order angular reflections of an a-o cell; the degree of which is quite limited. Therefore, the effecting of an object image 13 at the second stage projector 16, reduced in size relative to that of the font plate matrix of window means, makes it possible to circumvent the a-o cell limitation, which accordingly reduces the dimensional requirements between the font plate 10 and the X and Y cells.

It should be understood by those skilled in the arts pertaining to the construction and application possibilities of the invention herein set forth that the embodiment included herein illustrates in a very limited sence the usefulness of the invention, and that the invention includes other modifications and equivalents as they may be seen by those skilled in the arts, but still being within the scope of the appended claims.

I claim:

1. In a message character image projection control system including an array of character shaped light forming window means, a source of light and means for exposing the window means of said array to light from said source, and optical means positioned along an optical axis of said system for establishing individual optical path relationships between each said window means of the array and said optical axis, wherein the improvement comprises:
   (a) said optical means including first and second acousto-optic optical path relationship control means and each of said control means including an ultrasonic frequency transducer and an interaction medium positioned along said optical axis, and a source of ultrasonic frequency voltages and circuit means for connecting said transducers to this source of voltages for an establishing of any of a number of different acoustic wave light reflecting conditions within the interaction medium of said first control means and within the interaction medium of said second control means, each said optical path relationship corresponding, respectively, to a combination of said light reflecting conditions of said first and second control means;
   (b) means for establishing a predetermined one of said light reflecting conditions within said medium of the first control means and a predetermined one of said light reflecting conditions within said medium of the second control means and establishing a corresponding one of said optical path relationships between a predetermined one of the window means of said array and said optical axis;
   (c) said exposing of the window means of said array to light from said source including a flooding of the entire array of said window means, simultaneously, with light from said source of light, said flooding of the entire array of window means allowing a viewing of an optical image of said predetermined one of the window means from along said optical axis.

2. The invention as set forth in claim 1, including additionally first and second light projection optics positioned along said optical axis, intermediate said array of character shaped light forming window means and the interaction medium of said first control means, said first projection optics providing an object image of said array of window means coincident with the position of said second projection optics along said optical axis and at which position said object image are dimensions are substantially smaller than the area dimensions of said array of window means.

* * * * *